2,729,541

PREPARATION OF METAL CYANATES

David O. De Pree and Edgar Bradley Oldenburg, Royal Oak, Mich., assignors to Ethyl Corporation, New York, N. Y., a corporation of Delaware No Drawing. Application March 24, 1953, Serial No. 344,453

13 Claims. (Cl. 23—75)

This invention pertains to a process for the manufacture of inorganic chemicals and is particularly concerned with the manufacture of the inorganic cyanates.

The cyanates have had limited application in the past. However, they are finding increasing importance, particularly as intermediates in the preparation of organic compounds such as the urethanes and in the preparation of organic isocyanates. The processes utilized up to this time which have seemed to be most practical for the preparation of the cyanates have been the reaction of urea with inorganic salts and bases and also the reaction of ammonia and carbon dioxide with the inorganic salts and bases. These processes have had particular disadvantage and limited applicability since low yields are obtained, and the purity of the product has not been particularly favorable. The production of the cyanates by reacting the salts, for example, of the alkali metals with urea is considerably hindered because intimate mixture of the reactants is quite difficult, and the formation of by-products presents difficulty in their separation from the final product. Generally speaking, the product has been separated from the reaction mixture by recrystallizing in alcohol-water solutions or in water alone. This recrystallization is satisfactory only to a limited extent inasmuch as hydrolysis of the product occurs, and the yield is therefore reduced.

Similarly, the preparation of the cyanates via the reaction of the inorganic salts or bases with ammonia and carbon dioxide has particular disadvantage in that high temperatures and pressures must be utilized in order that the reaction will go to completion. Here again, low yields, insufficient mixing, and purity of the product are particular disadvantages. Understandably, the use of high temperatures and pressures increases the cost of operation, and elimination of these features is, of course, desirable. Further, a more simplified process which would produce a product of high purity more economically and efficiently than the present methods would enhance the use of the inorganic cyanates to a considerable extent and would, therefore, be of particular benefit to the art.

Consequently, it is an object of the present invention to overcome the difficulties experienced previously in the production of the inorganic cyanates by providing a new and economical process for their manufacture. A further object of this invention is to provide a process for the manufacture of the cyanates in high yields and a high degree of purity. In addition, this invention shall provide a more simplified and economical process for the production of these useful materials. These and other objects of the present invention will become apparent from the discussion hereinafter.

The above and other objects of our invention are accomplished by reacting a urea with dispersions of metals to produce their corresponding cyanates. Surprisingly, we have found that we can react a urea with dispersions of metals under moderate conditions with intimate mixing to produce the metallic cyanates in high purity and yield. In addition, we have found that our product so produced does not require recrystallization and, in fact, is marketable without requiring additional operations other than removing the cyanate from the reaction vessel. Thus, we have provided a new and novel process for the preparation of cyanates.

The process of this invention is carried out by placing a dispersion of the metal and a urea into a reaction vessel and heating the reaction mixture to an intermediate temperature while being agitated to instigate the interaction of the starting materials. At this point the reaction will continue of its own volition and is exothermic. When it is observed that the reaction has subsided, as evidenced by the reduction in the evolution of gas or in the lowering of the temperature of the reaction mixture, heat is again applied and the temperature increased to a temperature above the boiling point of the dispersing medium. In this manner the dispersing medium is driven off, and the reaction mixture, comprising a substantial proportion of an intermediate and a minor portion of unreacted metal and urea, is thereby concentrated into an intimate admixture. The reaction mixture is then heated to a temperature above the melting point of the urea. During this period the reaction proceeds to completion, exhibited by the amount of gases evolved. The product remainds in the reaction vessel and is discharged therefrom in a very high state of purity, suitable for marketing without further processing.

In the initial stage of our process gases are evolved. This gas comprises a substantial proportion of hydrogen with very minor proportions of ammonia, indicating the formation of an intermediate. It is, therefore, an embodiment of this invention to pass the gases evolved through water, thereby entraining any ammonia driven off and permitting recovery of the gas if desired. Thus, the first stage of reaction can be determined by observing the amount of hydrogen evolved. Upon driving off the dispersing medium, the reaction mixture is heated to a higher temperature, during which period ammonia is driven off. The ammonia serves as a method of determining completion of the reaction and also may be recovered if desired. It is not necessary that our process be carried out in this stage-wise manner; that is, it may be conducted by a continual increase in the temperature and withdrawal of the gases and dispersing medium. However, this procedure is not preferred in that the yield will be decreased. Similarly, the metal dispersion may be prepared in situ rather than being prepared beforehand.

As stated hereinbefore, the first step of our process is carried out at an intermediate temperature; that is, the reaction is instigated at a temperature below the boiling point of the dispersing medium. In general, we prefer to employ temperatures between about 60 and 110° C. Although a higher temperature may be employed, it is not desirable since the dispersing medium must be refluxed. Similarly, if lower temperatures are used, the reaction time may be unduly prolonged. During the course of this stage of our process, a substantial proportion of the metal-urea intermediate, as evidenced by the hydrogen gas evolved, is formed. Formation of this intermediate is desirable in that it is readily converted to the metal cyanate in the succeeding steps of our process.

The dispersants mentioned above which are employed in our process can be any dispersant suitable for this purpose. In general, we prefer those dispersing media which are liquids at room temperature and preferably those having a boiling point of between about 110 and 160° C. so that they may readily be driven off from the reaction mixture and thus not contaminate the product or hinder the reaction in the second step of our process.

As mentioned previously, the second step of our process is carried out at temperatures above the melting point of the urea. We have found that if this step of the reaction is carried out at this temperature, the minor proportion of unreacted urea will melt and be in a more suitable form to react with the unreacted metal, and thermal conversion of the intermediates will take place to form the cyanate. Further, this procedure enhances the ability, in conjunction with agitation, of increased contact between the unreacted materials. In general, we prefer to employ in the second step of our process temperatures of between about 140 to 200° C. Although temperatures not within this range may be employed, they are not preferred inasmuch as the yield will be decreased, or the reaction time may be unduly prolonged.

As stated hereinbefore, we can prepare the cyanates by reacting a urea with metals in a dispersed form. Although any metal may be employed in carrying out the process of our invention, we prefer to employ the alkali and alkaline earth metals due to their greater reactivity. Thus, the metals which we can employ are the alkali metals: sodium, potassium, lithium, rubidium, and cesium; or they can be the alkaline earth metals such as, for example, beryllium, magnesium, calcium, strontium, and barium. The particle size of the metals is critical only to the extent that their reactivity in our process will be reduced as the size of the particle increases. Thus, for more efficient reaction, small particle sizes are desirable; and, generally speaking, the particle sizes should consist of a substantial proportion of particles below about 20 microns in size; that is, those which are more susceptible to their utilization in a dispersed form.

By the term urea is intended both urea itself and thiourea. Accordingly, the corresponding cyanates obtainable from urea and thiourea are intended by the term "cyanates."

We have found that the preparation of the cyanates is more advantageously accomplished when a urea is reacted with the metals in a dispersing medium. The dispersing media which can be employed are those organic materials which are inert to both reactants. In general, we prefer to employ the hydrocarbons as the dispersing medium. Thus, among the hydrocarbons which we can employ are the various saturated and unsaturated acyclic and cyclic hydrocarbons and the aromatic hydrocarbons. Among the saturated hydrocarbons which we can employ are n-octane, n-nonane, n-decane, n-undecane, and the like up to and including n-octadecane and their various positional and branched chain isomers. Similarly, we can employ the unsaturated acyclic hydrocarbons such as, for example, the octenes, nonenes, and the like and their various isomers. In addition, we can employ the cyclic hydrocarbons such as, for example, the various substituted cyclohexanes. Among the aromatic hydrocarbons which we can employ as dispersing media are the compounds such as, for example, toluene, o-, m-, or p-xylenes, ethylbenzene, mesitylene, p-cymene, tetralin, and the like. It is not necessary that pure hydrocarbons be utilized as a dispersing medium in the process of our invention. We have found that mixtures thereof may also be used, or impure mixtures such as those obtained in the petroleum industry may also be used; for example, the heavy alkylates and mineral oils. In general, it is preferred that the dispersing media employed be liquids at room temperature and have a boiling point of between about 110 and 160° C. By utilizing hydrocarbons in this preferred boiling range it is not necessary to resort to a pressure operation or to reflux conditions, and the removal of the hydrocarbon is very easily obtained.

The proportions of the reactants employed are preferably maintained in stoichiometric ratios. Thus, when we react one mole of a urea, we prefer to react the stoichiometric quantity of the metal which is necessary to produce 100 per cent conversion to the cyanate. When the proportions of the reactants are varied substantially from this ratio, it has been found that contamination of the product will be obtained, or the yield will be reduced.

The proportion of the metal to the dispersing medium is not critical but will generally depend upon the particular metal which is employed. The metal dispersions are prepared by known methods currently in use in the art.

Typical examples for carrying out the process of our invention are as follows, wherein all parts and percentages are by weight.

*Example I*

The apparatus utilized consisted of a reaction vessel, a heating element, a means for agitation, distillation column, and gas collectors. Twelve parts (0.2 mole) of urea were added to 10 parts of a toluene dispersion containing 4.6 parts of sodium (0.2 mole). The mixture was agitated with an anchor type stirrer while being heated. The reaction was initiated at 80° C. and proceeded steadily to about 50 per cent conversion, which was determined by the amount of hydrogen gas evolved. The time required was about one hour at a final temperature of 110° C. As the reaction subsided the toluene was flashed off by heating; and the resultant mixture, comprising a substantial proportion of intermediates and minor proportions of starting materials, was heated with stirring to about 165° C. Ammonia evolution at the end of two hours indicated a yield of 98 per cent of the theoretical. The product remaining in the reaction vessel was discharged and analyzed. The analysis disclosed a purity of 90.2 per cent sodium cyanate.

*Example II*

In this example the same apparatus was used as described in Example I. Two and three-tenths parts of sodium (dispersed in a 50—50 mixture of n-octane and n-nonane) and 7.6 parts of thiourea were placed in the reaction vessel. The reaction mixture was agitated and heated to a temperature of about 87° C. At this temperature hydrogen gas was evolved, and the reaction proceeded spontaneously with a rise in temperature. When the temperature reached 130° C., the theoretical quantity of hydrogen had been collected, and the dispersing agents were then driven off at a temperature of about 160° C. The solid reaction mixture was then maintained at a temperature of about 170° C. until the evolution of ammonia gas subsided. A dry, reddish, solid product remained, and the ammonia gases which were evolved were collected by water absorption. Titration of the ammonia hydroxide solution with HCl indicated 90 per cent conversion to sodium thiocyanate.

Similarly, we can react dispersions of other metals than sodium in conducting the process of our invention. Thus, for example, we can react potassium dispersed in o-xylene with urea to produce potassium cyanate. Moreover, we can react lithium dispersed in a heavy alkylate with urea to produce lithium cyanate. In addition, we can react a dispersion of rubidium in mineral oil with urea to produce rubidium cyanate. Likewise, we can produce cesium cyanate by reacting urea with a dispersion of cesium in n-octane. Similarly, we can react a dispersion of calcium in nonene-1 with urea to produce calcium cyanate. Moreover, we can produce magnesium cyanate by reacting a dispersion of magnesium in ethyl cyclohexane with urea. Likewise, we can react urea with a dispersion of barium in 3-ethyl-3-methyl pentane to produce barium cyanate. In addition, we can produce strontium cyanate by reacting strontium dispersed in heavy alkylate with urea according to the process of our invention.

Similarly, the thiocyanates can be prepared by substituting thiourea for urea in the foregoing examples. It it not intended that we be restricted to the examples cited herein but that they merely serve as illustrations of the particular reactants which we can employ in the process of our invention. These and other examples will become apparent to those skilled in the art.

A further embodiment of our invention is the recovery of gases and the dispersing medium. Specifically, the hydrogen gas can be collected by conventional means if desired, and the ammonia gas can be recovered for further reaction with carbon dioxide to produce urea. Likewise, the dispersing medium is recovered and is again used in preparing the dispersion of the various metals which we employ.

Although the time of reaction of our process is not critical, we have found that it will be dependent upon the particular reactants involved and the rate of heating the reaction mixture. We have found that the best results are obtained when carrying out the process of our invention as described above in that within these limits an intimate mixture of the reactants is obtained, and the recovery of the gases and dispersants is more advantageously carried out in this manner. Further, the purity of the product is maintained at a desirable level.

Although the discussion hereinbefore has been restricted to the term cyanate, it is not intended that our process be limited to the production of the metal cyanates but that it also includes the metal isocyanates and the isothiocyanates. It is generally considered that these compounds are equivalent inasmuch as they are ionic in character, and therefore, either structure may be formed by the process of our invention. For example, sodium cyanate (NaOC≡N) and sodium isocyanate (NaN=C=O) will be produced by the process of our invention, and similarly, potassium thiocyanate (KSC≡N) and potassium isothiocyanate (KN=C=S) will be prepared.

The process of our invention has particular utility in that it provides an economical and advantageous procedure for producing the cyanates which have particular use as herbicides and defoliants. The products of our process are also useful in treatment of steel and in the surface treatment of metals, such as case hardening. These products are also useful as chemical intermediates. For example, they can be reduced to form the corresponding cyanides, or they may be employed in the prepartion of urethanes. They may also be employed in double decomposition reactions, such as the reaction of the cyanates with alkyl halides to produce organic isocyanates. Further, they can be utilized in the preparation of medicinals or sweetening agents. These and other uses will become apparent to those skilled in the art.

Having thus described the novel process of our invention, it is not intended that we be restricted except as noted in the appended claims.

We claim:

1. A process for the manufacture of metal cyanates, comprising reacting a dispersion of a metallic element with a urea.

2. The process of claim 1 wherein the metallic element employed is an alkali metal.

3. A process for the manufacture of metal cyanates, comprising reacting a dispersion of a metallic element with a urea at low temperatures until about 50 per cent conversion is obtained, then removing the dispersant by heating to a temperature above its boiling point.

4. The process of claim 3 wherein the metal dispersion and urea are maintained at a temperature of between about 60 and 110° C. for a period of time sufficient for about 50 per cent conversion to take place as exhibited by the amount of hydrogen gas collected; then driving off the dispersant at a temperature of between about 140 to 200° C. and maintaining the reaction mixture at that temperature for a sufficient time to allow the reaction to proceed substantially to completion.

5. The process of claim 4 further characterized in that the dispersing medium is an organic material having a boiling point of between about 110 and 160° C.

6. A process for the manufacture of metal cyanates comprising reacting a dispersion of a metallic element in an inert organic liquid with a urea.

7. A process for the manufacture of metal cyanates comprising reacting a dispersion of a metallic element in an inert organic liquid having a boiling point between about 110 and 160° C. with a urea at a temperature between about 60 and 110° C., subsequently raising the temperature to between about 140 to 200° C. to drive off said inert organic liquid and maintaining the reaction mixture at that temperature for a sufficient time to allow the reaction to proceed substantially to completion.

8. A process for the preparation of sodium cyanate which comprises reacting metallic sodium dispersed in toluene with urea at a temperature between about 60 and 110° C. for a period of time sufficient for about 50% conversion to take place as exhibited by the amount of hydrogen gas collected, then driving off the toluene at a temperature between about 140 to 200° C. and maintaining the reaction mixture at this temperature for sufficient time to permit the reaction to proceed substantially to completion.

9. The process of claim 7 wherein said metallic element is an alkali metal and said inert organic liquid is a hydrocarbon.

10. The process of claim 7 wherein said metallic element is an alkaline earth metal and said inert organic liquid is a hydrocarbon.

11. The process of claim 8 wherein said metallic sodium consists of particles below about 20 microns in size and said sodium and urea are present in essentially stoichiometric amounts.

12. The process of claim 7 wherein said metallic element is an alkali metal; said inert organic liquid is a hydrocarbon; and, said urea is thiourea.

13. A process for the preparation of sodium thiocyanate which comprises reacting about 2.3 parts of sodium dispersed in a mixture of n-octane and n-nonane with about 7.6 parts of thiourea at a temperature between about 87 to 130° C. until essentially the theoretical quantity of hydrogen has been collected, then heating the reaction mixture to about 160° C. to drive off said n-octane and n-nonane mixture and maintaining the solid reaction mixture thereby obtained at a temperature of about 170° C. for a period sufficient to permit the reaction to proceed substantially to completion.

References Cited in the file of this patent

UNITED STATES PATENTS

| | | |
|---|---|---|
| 1,915,425 | Kloepfer | June 27, 1933 |
| 2,563,044 | Kamlet | Aug. 7, 1951 |

FOREIGN PATENTS

| | | |
|---|---|---|
| 529,601 | Germany | July 17, 1931 |
| 812,251 | Germany | Aug. 27, 1951 |